United States Patent
Lacharme et al.

(10) Patent No.: US 11,601,487 B2
(45) Date of Patent: Mar. 7, 2023

(54) REAL-TIME WEB COMMUNICATION TRANSMISSION PROFILE ADAPTATION

(71) Applicant: Orange, Paris (FR)

(72) Inventors: Sandrine Lacharme, Lannion (FR); Romain Caron, Lannion (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 15/738,917

(22) PCT Filed: Jun. 23, 2016

(86) PCT No.: PCT/FR2016/051550
§ 371 (c)(1),
(2) Date: Dec. 21, 2017

(87) PCT Pub. No.: WO2016/207561
PCT Pub. Date: Dec. 29, 2016

(65) Prior Publication Data
US 2018/0183850 A1    Jun. 28, 2018

(30) Foreign Application Priority Data

Jun. 26, 2015 (FR) ...................... 1555956

(51) Int. Cl.
*G06F 15/16* (2006.01)
*H04L 65/65* (2022.01)
(Continued)

(52) U.S. Cl.
CPC .............. *H04L 65/65* (2022.05); *H04L 41/12* (2013.01); *H04L 47/263* (2013.01); *H04L 67/30* (2013.01)

(58) Field of Classification Search
CPC ..... H04L 65/608; H04L 41/12; H04L 47/263; H04L 67/30
See application file for complete search history.

(56) References Cited

U.S. PATENT DOCUMENTS 7,460,480 B2 * 12/2008 Awais ................ H04M 7/0072
704/200
8,250,618 B2 * 8/2012 Rosenzweig ...... H04N 21/2662
375/240.26
(Continued)

OTHER PUBLICATIONS

International Search Report and Written Opinion dated Oct. 17, 2016 for Application No. PCT/FR2016/051550.
(Continued)

*Primary Examiner* — Dustin Nguyen
*Assistant Examiner* — Hao H Nguyen
(74) *Attorney, Agent, or Firm* — Knobbe, Martens, Olson & Bear, LLP

(57) ABSTRACT

Embodiments described herein relate to the adaptation of a real-time Web communication transmission profile, particularly the adaptation of throughput such as the video throughput of the real-time Web communication. A method is described for adapting a real-time Web communication transmission profile, including changing a transmission profile parameter of a real-time Web communication device on the basis of bandwidth-related data recovered during a real-time Web communication time period. Thus, the transmission profile can be adapted to the bandwidth of the real-time Web communication in progress, allowing a user to enjoy the best quality when the bandwidth allows and, conversely, to limit transmission errors when the bandwidth does not allow high throughput.

15 Claims, 2 Drawing Sheets

Figure 1:
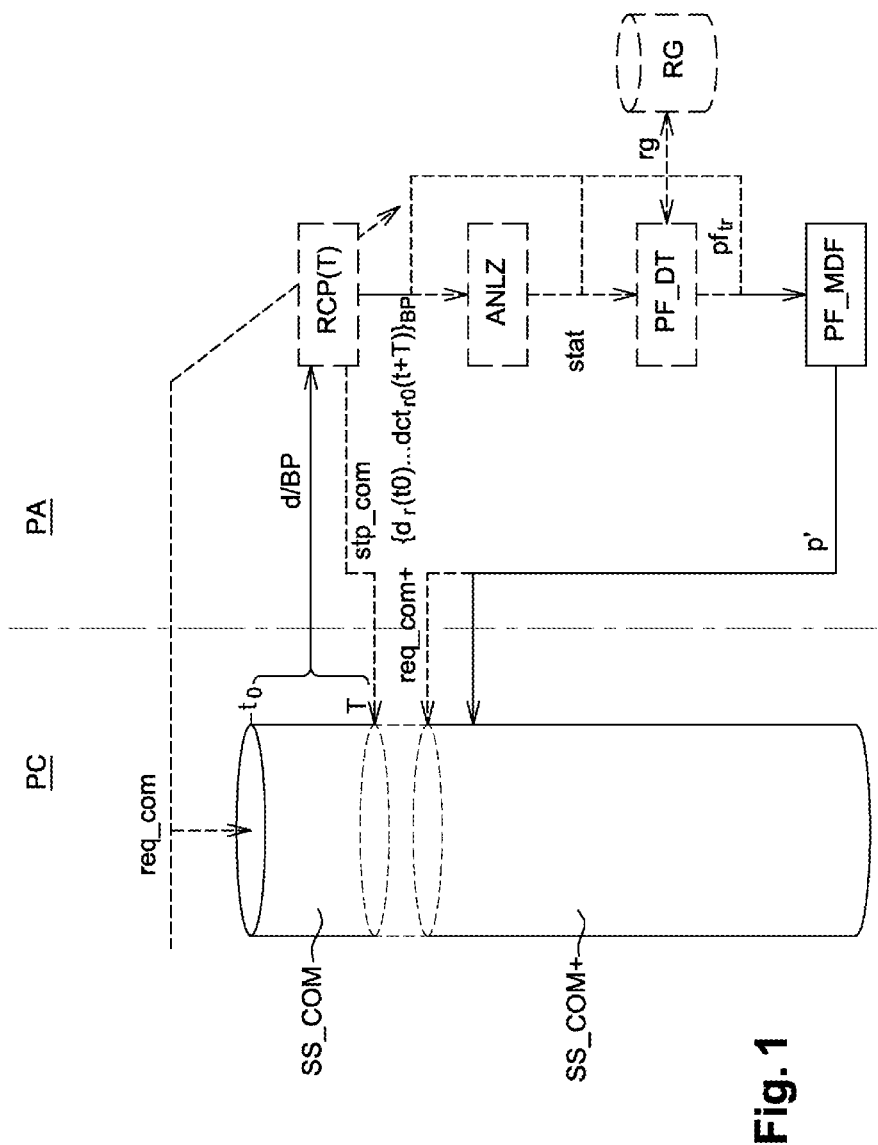

| BP | PF | RSV | | | | RTV | DBV |
|---|---|---|---|---|---|---|---|
| | | RSmax | | RSmin | | | |
| | | RSWmax | RSHmax | RSWmin | RSHmin | | |
| >1500 | HD | 1280 | 720 | 960 | 720 | 16/9 | 3000 |
| ]1000,1500] | SD+ | 640 | 480 | 640 | 360 | 16/9 | 1000 |
| ≤1000 | SD- | 320 | 240 | 320 | 180 | 16/9 | 500 |

(51) Int. Cl.
*H04L 47/263* (2022.01)
*H04L 41/12* (2022.01)
*H04L 67/30* (2022.01)

(56) References Cited

U.S. PATENT DOCUMENTS

| | | | | |
|---|---|---|---|---|
| 8,804,758 | B2* | 8/2014 | Bender | H04L 43/0829 370/465 |
| 8,935,363 | B2* | 1/2015 | Zang | H04L 65/611 725/86 |
| 8,964,851 | B2* | 2/2015 | Liu | F01L 1/267 375/240.26 |
| 9,432,436 | B2* | 8/2016 | Wei | H04L 65/80 |
| 2005/0201414 | A1* | 9/2005 | Awais | H04L 41/0896 370/468 |
| 2008/0084927 | A1* | 4/2008 | Rosenzweig | H04N 19/172 375/E7.145 |
| 2009/0232200 | A1* | 9/2009 | Henocq | H04N 21/234327 375/240.01 |
| 2010/0309984 | A1* | 12/2010 | Liu | F01L 1/267 375/E7.026 |
| 2012/0246279 | A1* | 9/2012 | Zang | H04L 65/65 709/219 |
| 2013/0215774 | A1* | 8/2013 | Bender | H04L 65/80 370/252 |
| 2014/0219167 | A1* | 8/2014 | Santhanam | H04L 67/02 370/328 |
| 2014/0372623 | A1* | 12/2014 | Chen | H04L 47/11 709/231 |
| 2015/0135234 | A1* | 5/2015 | Hall | H04N 21/2343 725/59 |
| 2016/0192029 | A1* | 6/2016 | Bergstrom | H04L 43/0882 709/219 |
| 2016/0219248 | A1* | 7/2016 | Reznik | H04N 21/23439 |
| 2017/0346601 | A1* | 11/2017 | Lee | H04L 1/1874 |

OTHER PUBLICATIONS

Kilinc, C., "ARAM WebRTC: A Rate Adaptation Model for WebRTC Real-Time Interactive Video Over 3GPP LTE", 2013, http://pure.itu.se/portal/files/919877 [retrieved on May 11, 2016].

Lundin, et al., "A Google Congestion Control Algorithm for Real-Time Communication on the World Wide Web; draft-alvestrand-rtcweb-congestion-03", Internet-Draft, IETF; Oct. 2012, pp. 1-18.

* cited by examiner

| BP | PF | RSV | | | | RTV | DBV |
|---|---|---|---|---|---|---|---|
| | | RSmax | | RSmin | | | |
| | | $RSW_{max}$ | $RSH_{max}$ | $RSW_{min}$ | $RSH_{min}$ | | |
| >1500 | HD | 1280 | 720 | 960 | 720 | 16/9 | 3000 |
| ]1000,1500] | SD+ | 640 | 480 | 640 | 360 | 16/9 | 1000 |
| ≤1000 | SD- | 320 | 240 | 320 | 180 | 16/9 | 500 |

REAL-TIME WEB COMMUNICATION TRANSMISSION PROFILE ADAPTATION

RELATED APPLICATIONS

This application is the U.S. National Phase of Application No. PCT/FR2016/051550 entitled "REAL-TIME WEB COMMUNICATION TRANSMISSION PROFILE ADAPTATION" filed Jun. 23, 2016, which designated the United States, and which claims the benefit of French Application No. 1555956 filed Jun. 26, 2015.

The invention relates to the adaptation of a transmission profile of a real-time Web communication, in particular the adaptation of a throughput such as the video throughput of the real-time Web communication.

Real-time Web communications are in particular defined today in the form of a WebRTC (Web Real Time communication) interface (also named API for application programming interface) by the W3C (consortium of the World Wide Web). They make it possible to support applications in video calling, video chat and file sharing between Web browsers without needing additional software components, such as a plug-in.

Currently:

Either the video throughput is fixed by the default real-time Web interface.

Or the video resolution can be modified by the user.

Or the video resolution is defined at the level of the application package using the real-time Web communication interface. For example, if the user of a terminal having at their disposal a real-time Web interface wishes to establish a video call. It is the activated video call device which modifies the resolution of the real-time Web communication interface before setting up the call.

Thus, the WebRTC communication is set up by applying constraints solely according to the application package.

Consequently, depending on the transmission channel at the time of the communication, the service rendered by the application package might be made noisy by transmission errors or of a lower quality.

One of the aims of the present invention is to remedy inadequacies of the prior art.

A subject of the invention is a method for adapting a real-time Web communication transmission profile comprising a modification of a transmission profile parameter of a real-time Web communication device as a function of bandwidth-related data recovered during a time span of a real-time Web communication.

Thus, the transmission profile adapts to the bandwidth of the real-time Web communication in progress, allowing the user to benefit from the best quality when the bandwidth so allows, and conversely to limit the transmission errors when the bandwidth does not allow a significant throughput.

Advantageously, the adaptation method comprises a recovery of the bandwidth-related data recovered during a time span of a real-time Web communication, the data recovered being used by the modification of the transmission profile parameter.

Thus, the adaptation does not have to request these data from an external retriever of data reducing the exchange interfaces.

Furthermore, the limiting of the data recovery to a time span reduces the calculations for modifying the transmission profile as a function of these data recovered since the number of data recovered is less significant. And, the recovery of several data serving to determine the modification of the transmission profile affords the possibility of a modification which adapted for a little more than a mere instant of transmission.

Advantageously, the data recovery is triggered by a real-time Web communication setup request.

Thus, the data recovery is carried out at the start of a communication limiting the interference between the recovery and the major part of the communication. Furthermore, recovery at the start of communication allows rapid adaptation of the profile at the start of the communication, thus offering the user a real-time Web communication of better quality as rapidly as possible.

Advantageously, the adaptation method triggers a closure of the real-time Web communication in progress as soon as the data recovery has terminated, and a setup of a new real-time Web communication triggered by the modification of the transmission profile parameter as a function of the data recovered provided by the recovery.

Thus, the data recovery is carried out at the start of a communication is dissociate from the communication. Furthermore, recovery at the start of communication allows the real-time Web communication requested by the user to begin with an already adapted profile.

Advantageously, the adaptation method comprises a determination of a transmission profile as a function of a statistical analysis of the data recovered, the transmission profile thus determined is used by the modification of the transmission profile parameter of the communication device.

Thus, the real-time Web communication will not suffer as a result of slight fluctuations of the transmission channel, the profile since account has been taken thereof in the formulation of the adaptation of the transmission profile by means of the statistical analysis.

Advantageously, the determination of the transmission profile is performed as a function of rules associating a predefined transmission profile with an interval of bandwidth values.

Thus, the adaptation is carried out in a simplified manner.

Advantageously, the transmission profile comprises at least one of the transmission parameters of the following list:

Video throughput,
Video resolution,
Audio throughput,
Audio resolution.

Thus, the video throughput and/or the video resolution and/or the audio throughput and/or the audio resolution of the real-time Web communication are adapted in relation to the bandwidth.

Advantageously, the adaptation method comprises a statistical analysis of the data recovered prior to the modification of the transmission profile.

Thus, the adaptation itself carries out the statistical analysis and does not have to request this analysis from an external analyzer reducing the exchange interfaces.

Advantageously, the statistical analysis provides as a function of the data recovered a bandwidth averaged over the predetermined time span.

Thus, the statistical analysis implements lightweight calculation means.

Advantageously, the adaptation method is a throughput adaptation method.

Advantageously, according to one realization of the invention, the various steps of the method according to the invention are implemented by a software package or computer program, this software package comprising software instructions intended to be executed by a data processor of an adaptor forming part of a real-time Web communication device and being designed to control the execution of the various steps of this method.

The invention therefore additionally envisages a program comprising program code instructions for the execution of the steps of the method for adapting the transmission profile when said program is executed by a processor.

This program can use any programming language and be in the form of source code, object code or code intermediate between source code and object code such as in a partially compiled form or in any other desirable form.

A subject of the invention is also a device for adapting a real-time Web communication transmission profile comprising a module for modifying a transmission profile parameter of a real-time Web communication device as a function of bandwidth-related data recovered during a time span of a real-time Web communication.

Another subject of the invention is a real-time Web communication device comprising a real-time Web communication transmission profile adaptor modifying a transmission profile parameter of a real-time Web communication device as a function of bandwidth-related data recovered during a time span of a real-time Web communication.

Figures 2, 3:
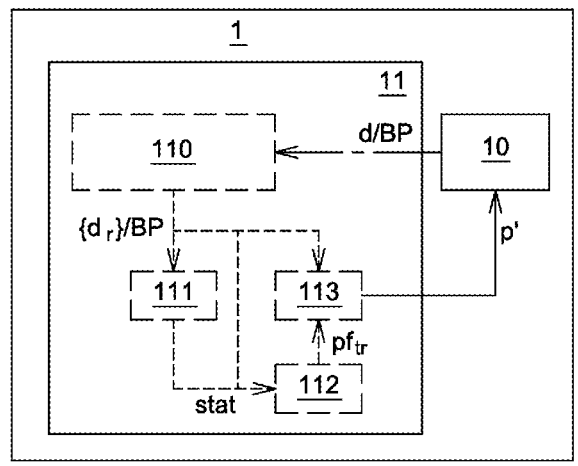

The characteristics and advantages of the invention will be more clearly apparent on reading the description, given by way of example, and figures relating thereto which represent:

FIG. 1, a simplified diagram of a throughput adaptation method according to the invention;

FIG. 2, a simplified table of profile adaptation rules according to the invention;

FIG. 3, a simplified diagram of a real-time Web communication device according to the invention.

FIG. 1 illustrates a simplified diagram of a throughput adaptation method according to the invention.

The method of adaptation PA of a real-time Web communication transmission profile comprises a modification PF_MDF of a transmission profile parameter of a real-time Web communication device as a function of bandwidth-related data $d_{/BP}$ recovered during a predetermined time span T of a real-time Web communication SS_COM.

The communication device implementing, in particular, a real-time Web communication method PC comprising at least one setup of a real-time Web communication session SS_COM upon a communication request req_com of a user by means of an interface of the communication device.

For example, the profile parameter of the real-time Web communication device passes from a value p to, in particular, a value p' provided by the modification PF_MDF or to a value dependent on p and on the value p' provided by the modification PF_MDF.

In particular, the adaptation method PA comprises a recovery RCP(T) of the bandwidth-related data $d_{/BP}$ recovered during a predetermined time span T of a real-time Web communication SS_COM, the data recovered $\{d_r(t_0) \ldots d_r(t_0+T)\}_{/BP}$ being used by the modification PF_MDF of the transmission profile parameter.

The data recovered are, in particular, statistics provided by the browser implementing the real-time Web communication method PC. For example, the recovery RCPT(T) triggers the dispatching by the browser of BitsSent with a Timestamp equal to the predetermined time span T. The bitsSent make it possible in return to recover bandwidth-related data.

In particular, the recovery RCT(T) of the data is triggered by a real-time Web communication setup request req_com.

In particular, the adaptation method PA triggers a closure stp_com of the real-time Web communication in progress as soon as the data recovery has terminated RCPT(T), and a setup of a new real-time Web communication req_com+ triggered by the modification PF_MDF of the transmission profile parameter as a function of the data recovered provided by the recovery.

In particular, the adaptation method PA comprises a determination of a transmission profile PF_DT as a function of a statistical analysis ANLZ of the data recovered, the transmission profile $pf_{tr}$ thus determined is used by the modification PF_MDF of the transmission profile parameter of the communication device.

In particular, the determination of the transmission profile PF_DT is performed as a function of rules rg associating a predefined transmission profile PF with an interval of bandwidth values BP, such as the rules, illustrated by FIG. 2, for adapting a profile associating a profile PF with a bandwidth BP.

In particular, the transmission profile $pf_{tr}$ comprises at least one of the transmission parameters of the following list:

Video throughput DBV,
Video resolution RSV,
Audio throughput DBA,
Audio resolution RSA.

In particular, the adaptation method PA comprises a statistical analysis ANLZ of the data recovered $\{d_r(t_0) \ldots d_r(t_0+T)\}_{/BP}$ prior to the modification PF_MDF of the transmission profile.

In particular, the statistical analysis ANLZ provides as a function of the data recovered $\{d_r(t_0) \ldots d_r(t_0+T)\}_{/BP}$ a bandwidth averaged over the time span T.

In particular, the adaptation method PA is a throughput adaptation method.

Thus, according to the mean video throughput currently in use and as a function of the data recovered a profile is determined which makes it possible in particular to modify the video resolution. The video throughput is adapted by modifying, for example, the communication session description protocol (SDP, Session Protocol Description in English), either a communication in progress or prior to a new communication.

A particular embodiment of the adaptation method is a program comprising program code instructions for the execution of the steps of the method for adapting the transmission profile when said program is executed by a processor.

Specifically, a particular embodiment of the adaptation method is a program comprising program code instructions for the execution of the steps of the real-time Web communication method and of the method for adapting the transmission profile when said program is executed by a processor.

Thus, the invention makes it possible to modify or to set up a real-time Web communication by applying constraints relating to the available bandwidth.

FIG. 2 illustrates a simplified table of profile adaptation rules according to the invention.

For a determined value of a bandwidth BP of a communication in progress, the adaptation rules provide for an adaptation of the video profile into a predefined video profile PFV comprising a predefined video resolution RSV, a predefined video ratio RTV and a predefined video throughput DBV.

In our example, when the data recovered make it possible to determine that the bandwidth is:

greater than a value of 1500 kb/sec, the adaptation rules make it possible to determine a video transmission profile PFV of HD type (high definition). This video transmission profile PFV provides for:

a video resolution RSV defined by a maximum width RSVmax of 1280, a maximum height RSHmax of 720, a minimum width RSVmin of 960, a minimum height RSHmin of 720;

a video ratio of 16/9th;

a modification of the video throughput by supplementing with a maximum additional video throughput of 3000 (for example: 'a=mid:video\r\n b=AS:3000\r\n' in WebRTC);

in an interval of value between 1000 kb/sec (excluded) and 1500 kb/sec (included), the adaptation rules make it possible to determine a video transmission profile PFV of SD+ type (higher standard definition). This video transmission profile PFV provides for:

a video resolution RSV defined by a maximum width RSVmax of 640, a maximum height RSHmax of 480, a minimum width RSVmin of 640, a minimum height RSHmin of 360;

a video ratio of 16/9th;

a modification of the video throughput by supplementing with a maximum additional video throughput of 1000 (for example: 'a=mid:video\r\n b=AS:1000\r\n' in WebRTC); and less than or equal to 1000 kb/sec, the adaptation rules make it possible to determine a video transmission profile PFV of SD-type (lower standard definition). This video transmission profile PFV provides for:

a video resolution RSV defined by a maximum width RSVmax of 320, a maximum height RSHmax of 240, a minimum width RSVmin of 320, a minimum height RSHmin of 180;

a video ratio of 16/9th;

a modification of the video throughput by supplementing with a maximum additional video throughput of 500 (for example: 'a=mid:video\r\n b=AS:500\r\n' in WebRTC).

These profiles have been defined for the use of the WebRTC during television broadcasting, in particular of television on demand, or of games available in the cloud (Cloud gaming in English). Other profiles can be added as a function of the services using real-time Web communication.

FIG. 3 illustrates a simplified diagram of a real-time Web communication device according to the invention.

The adaptation device 11 for adapting a real-time Web communication transmission profile, also named real-time Web communication transmission profile adaptor, comprises a modification module 113 for modifying a transmission profile parameter of a real-time Web communication device 1 as a function of bandwidth-related data $d_{/BP}$ recovered during a time span T of a real-time Web communication.

In particular, the adaptation device 11 comprises a retriever 110 for recovering the bandwidth-related data $d_{/BP}$ recovered during a predetermined time span T of a real-time Web communication SS_COM, the data recovered $\{d_r(t_0) \ldots d_r(t_0+T)\}_{/BP}$ being used by the transmission profile parameter modification module 113.

In particular, the triggering of the data retriever 110 is controlled by a real-time Web communication setup request req_com.

In particular, the adaptation device 11 triggers a closure stp_com of the real-time Web communication in progress as soon as the data recovery has terminated RCPT(T), and a setup of a new real-time Web communication req_com+ triggered by the transmission profile parameter modification module 113 as a function of the data recovered provided by the recovery.

In particular, the adaptation device 11 comprises a determination module 112 for determining a transmission profile as a function of a statistical analysis of the data recovered, the transmission profile $pf_{tr}$ thus determined is used by the modification module 113 for modifying the transmission profile parameter of the communication device.

In particular, the module for the determination 112 of the transmission profile performs the determination as a function of rules rg associating a predefined transmission profile PF with an interval of bandwidth values BP, such as the rules, illustrated by FIG. 2, for adapting a profile associating a profile PF with a bandwidth BP.

In particular, the transmission profile $pf_{tr}$ comprises at least one of the transmission parameters of the following list:

Video throughput DBV,
Video resolution RSV,
Audio throughput DBA,
Audio resolution RSA.

In particular, the adaptation device 11 comprises a statistical analyzer 111 of the data recovered $\{d_r(t_0) \ldots d_r(t_0+T)\}_{/BP}$ which is placed before the transmission profile modification module 113.

In particular, the statistical analyzer 111 provides as a function of the data recovered $\{d_r(t_0) \ldots d_r(t_0+T)\}_{/BP}$ a bandwidth averaged over the time span T.

In particular, the adaptation device PA is a throughput adaptation device.

In particular, a real-time Web communication device 1 comprises a real-time Web communication transmission profile adaptor 11 modifying a transmission profile parameter of the real-time Web communication device 1 as a function of bandwidth-related data $d_{/BP}$ recovered during a time span T of a real-time Web communication.

For example, the profile parameter of the real-time Web communication device passes from a value p to, in particular, a value p' provided by the modification PF_MDF or to a value dependent on p and on the value p' provided by the modification PF_MDF.

The communication device 1 implements, in particular, a real-time Web communication method PC comprising at least one setup of a real-time Web communication session SS_COM upon a communication request req_com of a user by means of an interface of the communication device. In particular, the communication device 1 furthermore comprises a real-time Web transmitter 10, such as a WebRTC interface of a browser implemented by the communication device. Thus, the modified transmission profile parameter is that of the real-time Web transmitter 10.

The communication device 1 is a communication terminal such as a Smartphone, a tablet, a phablet, a computer . . . .

The invention also envisages a medium. The information medium can be any entity or device capable of storing the program. For example, the medium can comprise a storage means, such as a ROM, for example a CD ROM or a microelectronic circuit ROM or else a magnetic recording means, for example a diskette or a hard disk.

Moreover, the information medium can be a transmissible medium such as an electrical or optical signal which can be conveyed via an electrical or optical cable, by radio or by other means. The program according to the invention can be in particular downloaded from a network in particular of Internet type.

Alternatively, the information medium can be an integrated circuit in which the program is incorporated, the circuit being adapted to execute or to be used in the execution of the method in question.

In another realization, the invention is implemented by means of software components and/or hardware components. In this regard the term module can correspond equally well to a software component or to a hardware component. A software component corresponds to one or more computer programs, one or more subprograms of a program, or more generally to any element of a program or of an item of software able to implement a function or a function set according to the description hereinbelow. A hardware component corresponds to any element of a hardware assembly able to implement a function or a set of functions.

The invention claimed is:

1. A method for adapting a real-time Web communication transmission profile of a real-time Web communication interface of a browser, the method implemented by a real-time Web communication device, the method comprising:
   recovering bandwidth-related data recovered during a time span of a real-time Web communication by receiving the bandwidth-related data from the browser;
   triggering a closure of the real-time Web communication in progress as soon as the data recovery has terminated;
   modifying, using a modification module of an adaptation device of the real-time Web communication device, a transmission profile browser parameter of a real-time Web communication interface of a browser using the bandwidth-related data recovered during the time span of the real-time Web communication; and
   setting up a new real-time Web communication as soon as the transmission profile parameter is modified as a function of the data recovered provided by the recovery.

2. The method of claim 1, wherein the data recovery is triggered by a real-time Web communication setup request.

3. The method of claim 1, additionally comprising determining a transmission profile as a function of a statistical analysis of the data recovered, wherein the transmission profile thus determined is used in modifying the transmission profile parameter of the real-time Web communication interface of the browser.

4. The method of claim 3, wherein determining the transmission profile is performed as a function of rules associating a predefined transmission profile with an interval of bandwidth values.

5. The method of claim 1, wherein the transmission profile browser parameter comprises at least one of the transmission parameters of the following list:
   Video throughput,
   Video resolution,
   Audio throughput,
   Audio resolution.

6. The method of claim 1, additionally performing a statistical analysis of the data recovered prior to the modification of the transmission profile.

7. The method of claim 6, wherein the statistical analysis provides as a function of the data recovered a bandwidth averaged over a predetermined time span.

8. The method of claim 6, wherein the adaptation method is a throughput adaptation method.

9. A non-transitory computer readable medium having stored thereon instructions, which when executed by a processor, cause the processor to perform the method of claim 1.

10. A device for adapting a real-time Web communication transmission profile of a real-time Web communication interface of a browser, the device comprising a processor and a memory, the device comprising:
    a retriever configured to recover bandwidth-related data recovered during a time span of a real-time Web communication by receiving the bandwidth-related data from the browser;
    trigger a closure of the real-time Web communication in progress as soon as the data recovery has terminated;
    a modification module configured to modify a transmission profile browser parameter of a real-time Web communication interface of a browser using the bandwidth-related data recovered during the time span of the real-time Web communication; and
    set up a new real-time Web communication as soon as the transmission profile parameter is modified as a function of the data recovered provided by the recovery.

11. A real-time Web communication device comprising a processor and a memory, the device comprising a real-time Web communication transmission profile adaptor configured to:
    recover bandwidth-related data recovered during a time span of a real-time Web communication by receiving the bandwidth-related data from the browser;
    trigger a closure of the real-time Web communication in progress as soon as the data recovery has terminated;
    modify, using a modification module of the real-time Web communication transmission profile adaptor, a transmission profile parameter of a real-time Web communication interface of a browser using the bandwidth-related data recovered during a time span of a real-time Web communication; and
    set up a new real-time Web communication as soon as the transmission profile parameter is modified as a function of the data recovered provided by the recovery.

12. The method of claim 1, wherein the transmission profile browser parameter comprises video throughput.

13. The method of claim 1, wherein the transmission profile browser parameter comprises video resolution.

14. The method of claim 1, wherein the transmission profile browser parameter comprises audio throughput.

15. The method of claim 1, wherein the transmission profile browser parameter comprises audio resolution.

* * * * *